Dec. 29, 1964  T. S. CALHOUN  3,163,819
CONDITION RESPONSIVE APPARATUS WITH
VISUAL AND AUDIBLE READOUT
Filed Dec. 29, 1960  2 Sheets-Sheet 1
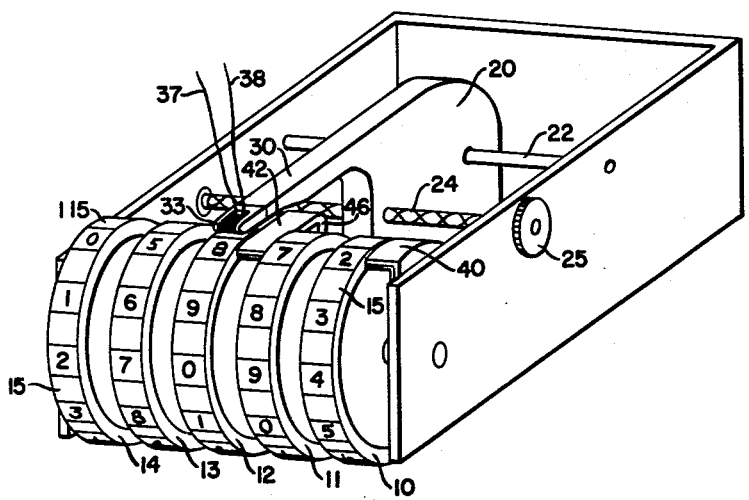
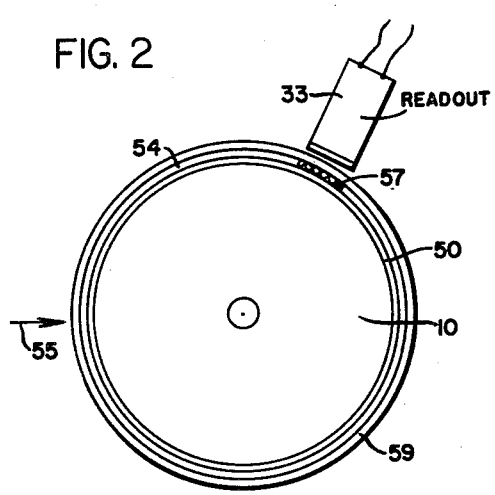
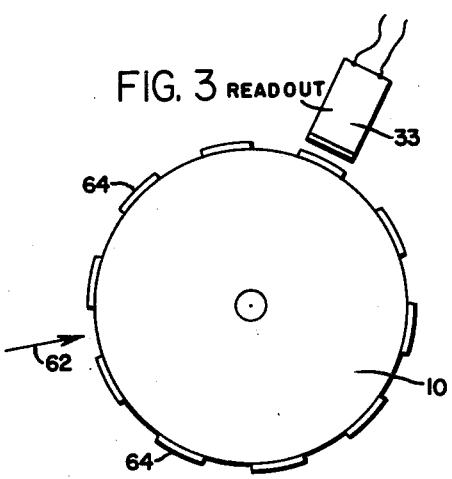
*INVENTOR.*
THOMAS S. CALHOUN
BY Charles J. Ungamach
ATTORNEY

Dec. 29, 1964     T. S. CALHOUN     3,163,819
CONDITION RESPONSIVE APPARATUS WITH
VISUAL AND AUDIBLE READOUT

Filed Dec. 29, 1960                                           2 Sheets-Sheet 2

INVENTOR.
THOMAS S. CALHOUN
BY *Charles J. Ungemach*
ATTORNEY

United States Patent Office 3,163,819
Patented Dec. 29, 1964

3,163,819
CONDITION RESPONSIVE APPARATUS WITH
VISUAL AND AUDIBLE READOUT
Thomas S. Calhoun, Hopkins, Minn., assignor to
Honeywell Inc., a corporation of Delaware
Filed Dec. 29, 1960, Ser. No. 79,256
3 Claims. (Cl. 324—99)

This invention has to do with control apparatus and more particularly with apparatus for audibly indicating the value of a measured condition. It is sometimes desirable that an operator of a condition measuring device be able to hear the value of the condition he is measuring as well as to see it. When due to poor lighting conditions or due to a large number of devices which the operator has to keep track of it becomes difficult to read the indicators and keep track of them, an indicator which audibly announces the value of the condition being measured eases and improves the operator's supervision of the conditions. The present invention therefore has as an object to audibly repeat the reading of an indicator.

It is a further object of the present invention to audibly as well as visually indicate the value of a measured condition.

Briefly the invention comprises a drum type counter indicator in which each drum has a plurality of numbers printed to visually indicate the value desired. In addition each drum has magnetic recordings properly placed with respect to the printed numbers, each recording comprising the sound of one of the numbers. When the drums have assumed a position indicative of the condition being measured magnetic record reproducing apparatus is set in motion to scan the drums in such a manner that the operator hears the number being displayed by the indicator.

A more complete understanding of the present invention will be obtained upon examination of the following specification and claims in connection with the drawings in which:

FIGURE 1 is a representation of a drum type counter employing the present invention;

FIGURE 2 is a cross-sectional view of a drum showing one method of placing recording tape thereon;

FIGURE 3 is a cross-sectional view of an alternate method of placing the recording tape on a drum.

Figure 4:
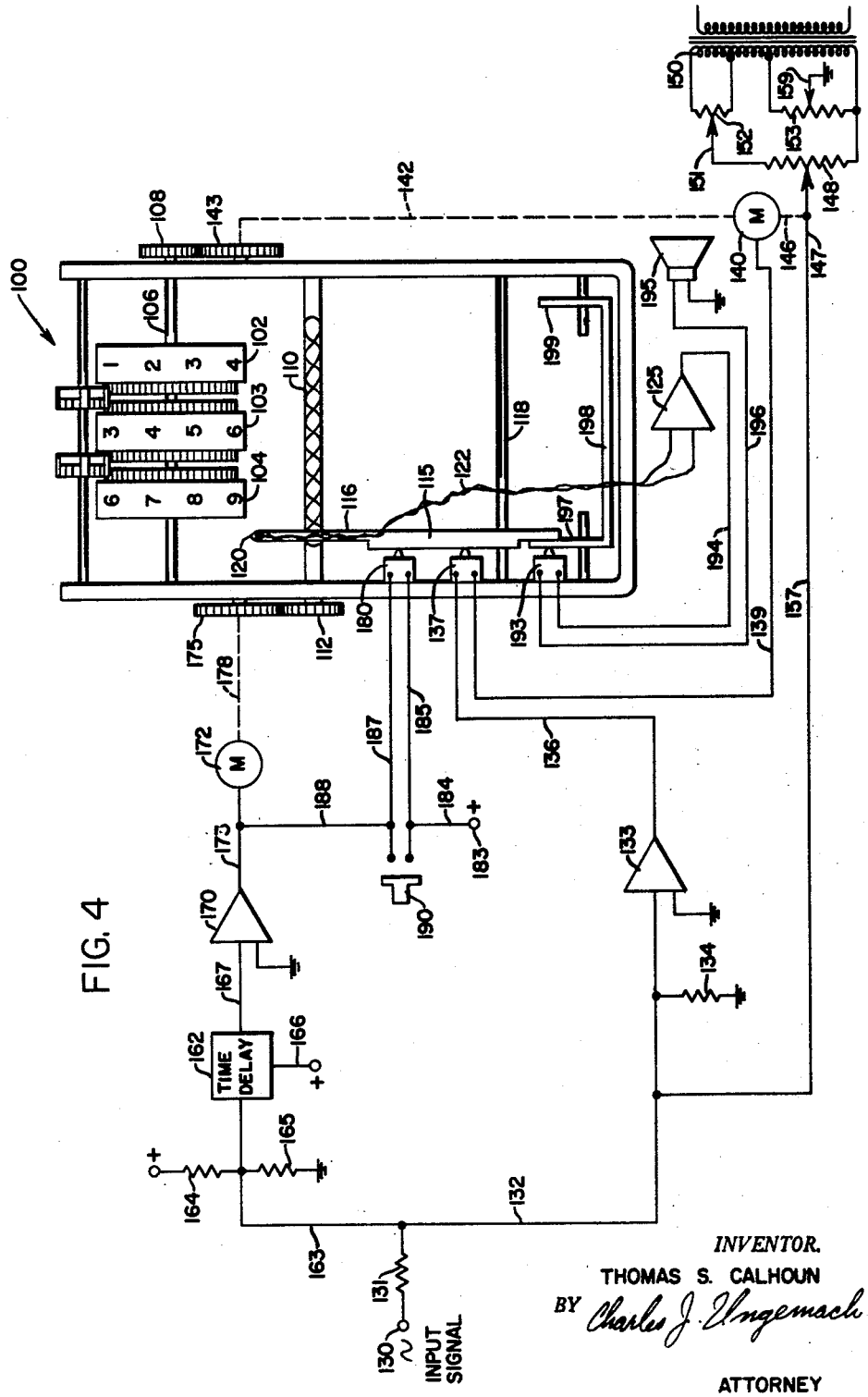
FIGURE 4 is a schematic representation of a condition measuring system employing the present invention.

Referring to FIGURE 1, a simplified counter is shown as having a plurality of rotatable members or drums 10, 11, 12, 13 and 14 mounted co-axially, side by side. Each drum has the ten digits of the decimal system inscribed in order thereon at equal intervals around the periphery thereof, with equal spaces between the digits. As is normal with counters of this sort, each drum is driven by the drum beside it through a Geneva or equivalent movement so that the reading of drum 14 changes by one number each time drum 13 passes between 9 and 0, etc. Of course, drum 10 is continuously rotatable and is driven to comprise the input to the counter. Except for drum 10, none of the drums is ever positioned for any appreciable time with a space aligned with the numbers on the other drums.

The spaces between the numbers on the various drums carry sound records of the spoken digits magnetically recorded thereon. The sound records are arranged in the same order as the visual indications, but are displaced around the drums by somewhat more than 90°. For example, drum 14 which is displaying the visual symbol "2" has the audible symbol or sound record "2" contained in the space between the visual symbols 9 and 0: sound record "3" is between the visual records 0 and 1, and so on. Sound records on the other drums are similarly arranged. Thus just as a visual scan of the drums parallel to the common axis gives to the operator an ocular indication of the instrument reading, so a magnetic scan of the drums parallel to the common axis, but at a point 90° displaced around the periphery of the drum, gives to the operator an audible indication of the instrument reading, when suitable tape reading mechanism is used.

The apparatus for turning dums 10 through 13 in accordance with the condition being measured has not been shown in FIGURE 1 but will be more completely explained upon examination of FIGURE 4. As the drums are caused to rotate, visual and magnetic symbols are presented in the appropriate positions.

FIGURE 1 also shows a member 20 slidably mounted on a guide bar 22 and driven by a member 24 which may be an endless reversing screw or level wind gear which in turn is connected to a gear 25. It will be seen that upon rotation of gear 25 level wind gear 24 causes member 20 to move from left to right. Member 20 has an arm 30 which extends over the top part of drums 10 through 14 and has attached thereto a magnetic reproducing head 33. Magnetic reproducing head 33 travels close to the upper surfaces of drums 10 through 14 so as to readout the recordings in the upper positions of the drums. As member 20 and arm 30 progress from left to right the magnetic reproducing head 33 reads numbers "two-seven-zero-nine-four" with the drums in the position shown in FIGURE 1. By means of wires 37 and 38 the reproducer signals are sent to a suitable amplifier to provide the operator with an audible presentation of the counter's indication. If the drums are caused to rotate by virtue of a changing condition, member 20 and arm 30 when caused to move from left to right read different numbers, but in each case the numbers correspond to the visual indication being provided by the counter.

FIGURE 1 also shows two additional members associated with the drums. A member 40 is shown to the right of drum 10 near the top and a member 42 is shown between drums 11 and 12 at the top. The purpose of member 40 is to carry a record of the name of the condition being measured. For example if the apparatus is set up as a voltmeter member 40 has recorded thereon the word "volts." The purpose of member 42 is to carry a magnetic record of the name of a mark of division such as a decimal point, so that as the decades are scanned member 42 places the decimal point by inserting the word "point" between the numbers read from the drums on each side of it. Thus as member 20 and arm 30 progress from left to right in FIGURE 1 the operator hears 'two-seven-zero-point-nine-four-volts" and thus knows that the apparatus visually indicates 270.94 volts. Member 42 is shown attached to an arm 46 which may be made laterally movable so that the member may occupy the space between drums 10 and 11 or that between drums 12 and 13 or that between drums 13 and 14 as well as that between drums 11 and 12, so that various ranges of voltage can be measured with the same apparatus.

Referring now to FIGURE 2 a drum such as 10 has been shown in a cross-sectional view. Around the drum 10 may be laid a first layer of non-magnetic material 50 such as nylon or aluminum to form a base material. On top of the nylon base material 50 may be laid a layer 54 of magnetic recording material such as a standard recording tape with recorded numbers appropriately placed thereacross. For example, if the operator were observing the number 9 from the direction of arrow 55 then the area 57 shown in black on layer 54 should have the recorded number "nine" thereon since the magnetic reproducing head 33 is located adjacent to that portion of the tape. Finally a layer 59 of non-magnetic material such as nylon may be laid around the magnetic recording tape 54 and have the properly spaced digits imprinted thereon for visual indication.

FIGURE 3 shows an alternate method of constructing drum 10 for purposes of the present invention. As shown in FIGURE 3 drum 10 has the digits directly printed thereon so that an operator looking from the direction of arrow 62 would read, for example, "3." A number of separate pieces of magnetic recording tape 64, each having the sound of one of the digits recorded thereon, are spaced around the drum so as to be properly placed with respect to the magnetic recording head 33. Thus in FIGURE 3 the piece of magnetic tape directly adjacent recording head 33 has recorded thereon "three" so as to reproduce what the operator visually sees. Obviously various other methods could be used to properly place a magnetic recording on a drum type counter and the embodiments shown in FIGURES 2 and 3 are representative only.

In FIGURE 4 a system is shown which is operable to visually indicate the value of a measured condition and to audibly reproduce it at various predetermined times. A drum type counter 100 is shown in FIGURE 4 which has only three rotatable members but it is obvious that any number of drums could be used. The drums 102, 103 and 104 are mounted on a shaft 106 driven by a gear 108. As gear 108 rotates drum 102 rotates, in discrete increments and after revolving one complete turn will advance drum 103 one space in the standard manner. It can be assumed in FIGURE 4 that the operator is observing the number 742 on the drums but of course this depends on the placement of an observation slot not shown.

Also shown in FIGURE 4 is a level wind gear 110, so cut that a member 115 which it carries travels from left to right and back again while the gear is rotating in one direction. Level wind gear 110 is driven by a gear 112. Member 115 has an arm 116 and is arranged to be driven by the level wind gear 110 and to be guided by a bar 118. Arm 116 has a magnetic reproducing head 120 on the end thereof connected by suitable lead wires 122 to an amplifier 125. Upon initiation of an operating cycle member 115 is moved by level wind gear 110 from the position shown in FIGURE 4 to the right and back again so that magnetic recording head 120 passes close to predetermined portions of the drums 102, 103 and 104. As previously explained the portions of the drums 102, 103 and 104 across which reproducing head 120 passes have recorded thereon the sounds of the appropriate numbers which in FIGURE 4 would be "seven-four-two."

The apparatus for causing the indicator to audibly indicate the value of the condition will now be described. An input signal which is indicative of the condition being measured is applied to terminal 130 and fed through a resistor 131 and a conductor 132 to the input of an amplifier 133 which is biased with respect to ground by a resistor 134. The output from amplifier 133 is applied through conductor 136 a normally closed switch 137, and conductor 139, to a motor 140. Switch 137 is held to the closed position by member 115 when the member is at the left extremity of its motion. Thus an input signal applied to terminal 130 will cause motor 140 to rotate. Motor 140 operates through a mechanical connection shown as dashed line 142 to turn a gear 143 which is operatively connected to gear 108 driving the counter mechanism. Motor 140 is also shown connected by a mechanical connection 146 to position a movable wiper 147 on a rebalance potentiometer winding 148. Rebalance potentiometer winding 148 has one end connected to a first, lower terminal of a secondary transformer winding 150 and has a second end connected to a calibration potentiometer wiper 151 operating along a resistance winding 152 connected across an upper portion of the transformer winding 150. Connected across the lower portion of transformer winding 150 is a calibration potentiometer winding 153 having a wiper 159 connected to ground. Movement of motor 140 in positioning wiper 147 derives a voltage thereon which is of a suitable phase so as to oppose the input signal derived at 130. This voltage is fed to the input of amplifier 133 by a conductor 157. Thus the input signal derived at 130 causes motor 140 to turn until the voltage on 147 is equal and opposite to the input signal at which time motor 140 stops and the counter mechanism including drums 102, 103 and 104 is in a position indicative of the value of the input signal.

In addition to being applied to amplifier 133 the input signal derived at terminal 130 is fed to a time delay means such as a one shot multivibrator 162 through a conductor 163. Multivibrator 162 may be of the type found on page 14 of a Technical Report No. 177 entitled One-Megacycle Silicon Transistor Circuits Applicable to Airborne Digital Systems by V. J. Sferrino and W. G. Schmidt of Lincoln Laboratory, Massachusetts Institute of Technology, and dated March 19, 1958, which appeared as Armed Services Technical Information Agency document ASTIA 110045, although other time delay means operable to delay the signal from terminal 130 until motor 140 has caused rebalance of the system will do. Multivibrator 162 is biased with respect to ground by resistors 164 and 165 and may be connected to a source of voltage by a conductor 166. The purpose of multivibrator 162 is to initiate the magnetic pickup drive when a change in the input signal of predetermined magnitude has occurred and after motor 140 has caused wiper 147 to accomplish rebalance. The threshhold of multivibrator 162 should be set at approximately the same value as the sensitivity limit of the amplifier 133 and motor 140 so that any change of input signal of sufficient magnitude to cause operation of motor 140 will also cause resetting of multivibrator 162 so that upon rebalance the multivibrator will provide an output. The output of the multivibrator 162 is fed by a conductor 167 to an amplifier 170 which in turn operates to drive a motor 172 by means of a connection 173. Motor 172 is shown operable to drive a gear 175 by a mechanical connection shown as dashed line 178. Gear 175 cooperates with gear 112 to drive the level wind gear 110 and initiate motion of member 115 and recording head 120. Because of the time delay provided by the threshhold setting of the multivibrator 162 the input signal applied from terminal 130 does not immediately cause motor 172 to turn but a sufficient delay occurs to allow motor 140 to cause rebalance of the system through potentiometer wiper 147. Thus before motor 172 begins to turn, the counter mechanism 100 will have reached the appropriate value indicative of the condition. After suitable interval motor 172 starts to operate turning gear 175, gear 112 and level wind gear 110, thereby moving arm 115 to the right. As soon as member 115 starts to the right switch 137 is caused to open to prevent further change in the position of the counter 100 during the "read out" portion of the cycle. Also when member 115 starts to the right, a switch 180 normally biased to the open position by arm 115 is caused to close. This presents a signal supplied at a terminal 183 to be fed through conductors 184, 185, switch 180, conductor 187 and conductor 188 to motor 172. Thus although the output from multivibrator 162 is of only short duration a signal to drive motor 172 will be continuously applied until member 115 has returned to the extreme left position. As member 115 moves to the right magnetic reproducing head 120 moves adjacent the recorded portions of drums 104, 103 and 102 to present a signal through conductors 122 to amplifier 125. When member 115 again returns to the far left position it operates to open switch 180, thereby stopping motor 172, and to close switch 137, to allow motor 140 to operate when again necessary. If the operator desires to listen to a reading at any time between the automatic operations he may close a switch 190 which provides a path for signal from terminal 183 through conductors 184, switch 190 and conductor 188 to start motor 172. Thus not only does the apparatus operate to provide automatic indication whenever there is a change in input at terminal 130 but the operator can initiate operation at any time he desires by pushing switch 190.

In order to prevent the magnetic reproducing head 120 from reading the numbers backwards as it progresses from right to left on its return path the following apparatus is provided. The output from amplifier 125 which corresponds to the numbers being read by the reproducing head 120 is applied through a switch 193 by a conductor 194 and from switch 193 to speaker 195 by a conductor 196. In the position shown in FIGURE 4 switch 193 is being held closed by an extension 197 of a slideable member 198 actuated by member 115. As member 115 starts to the right at the beginning of its cycle switch 193 is closed and amplifier 125 is connected to speaker 195 so that the operator hears the numbers picked up by reproducing head 120 on its path from left to right. When member 115 reaches the right extremity of its travel it contacts an extension 199 of member 198 and slides member 198 to the right so that extension 197 allows switch 193 to open. Then while arm 115 is returning from right to left the output from amplifier 125 is not connected to speaker 195 and no signal is presented. When arm 115 finally reaches the left end of its travel it again contacts extension 197 of member 198 to thereby close switch 193 and again connect the output of amplifier 125 with speaker 195 in preparation for the next cycle.

In the description of FIGURE 4, the line phase connections to the motors and the power supplies for the amplifiers have not been shown since these are well known necessities and their inclusion would only encumber the drawing.

It is thus seen that apparatus has been provided which gives audible and visual indication of a condition being measured. Although the preferred embodiment has been shown with various gear mechanisms and switches and the like, many obvious alternates will occur to those skilled in the art. For example, while the input signal and the rebalance signal have been shown as alternating voltages, the apparatus will work equally well with D.C. voltages. I therefore do not intend to be limited by the preferred embodiment shown but intend to be limited solely by the following claims.

I claim as my invention:

1. Apparatus for audibly indicating the value of a condition comprising, in combination: a counter mechanism having a plurality of movable members each with a suitable signal recorded thereon; first movable means operable in response to an electrical signal of magnitude indicative of the condition to move said members to a position indicative of the condition; feedback means operated by said first movable means to null the electrical signal; pickup means operable to scan the plurality of movable members and audibly reproduce the signals recorded thereon; second movable means operable to move said pickup means; time delay means connected to receive the electrical signal and to operate said second movable means; and switch means operable by said pickup means to disconnect said first movable means when said second movable means is in operation.

2. Condition indicating apparatus comprising, in combination: indicator means having a plurality of movable members each member having a plurality of indicia thereon; drive means having an input and operable to position the members; condition signal producing means connected to the input of said drive means so as to provide a signal of a first sense and of magnitude indicative of the condition to be indicated; rebalance signal producing means connected to be driven by said drive means and to produce a signal having a sense opposite the first sense and of magnitude which is controlled by said drive means; means connecting said rebalance signal producing means to the input of said drive means so that the rebalance signal opposes the condition signal and nulls the input to said drive means; scanning means having an input and operable to scan said members and produce an output indicative of the condition; and means including delay means connected to the input of said measuring means and operable to start operation of said scanning means whenever said drive means and said rebalance signal producing means has operated to null a change of condition signal.

3. Indicating apparatus comprising, in combination: a plurality of members, each member having a plurality of indicia thereon; drive means having an input and operable to position said members; means connecting the input of said drive means to a source of condition indicative signal so that said drive means positions said members in accordance with a condition to be indicated; a source of rebalance signal of variable magnitude connected to the input of said drive means; means connecting said source of rebalance signal to said drive means to vary the magnitude of the signal from said source of rebalance signal and to null the condition indicative signal; and means operable to scan said members and to provide an output indicative of the condition, said last named means including delay means to prevent the scan of said members for a predetermined time after a change of condition indicative signal.

References Cited in the file of this patent

UNITED STATES PATENTS

| | | |
|---|---|---|
| 2,416,445 | Jensen | Feb. 25, 1947 |
| 2,680,150 | Weld | June 1, 1954 |
| 2,855,585 | Quinby | Oct. 7, 1958 |
| 3,081,431 | Werner | Mar. 12, 1963 |